Aug. 11, 1953 W. I. BEACH 2,648,370
METHOD AND APPARATUS FOR PROGRESSIVE
FORMING OF C-STAGE PLASTIC MATERIAL
Filed March 18, 1950 3 Sheets-Sheet 1
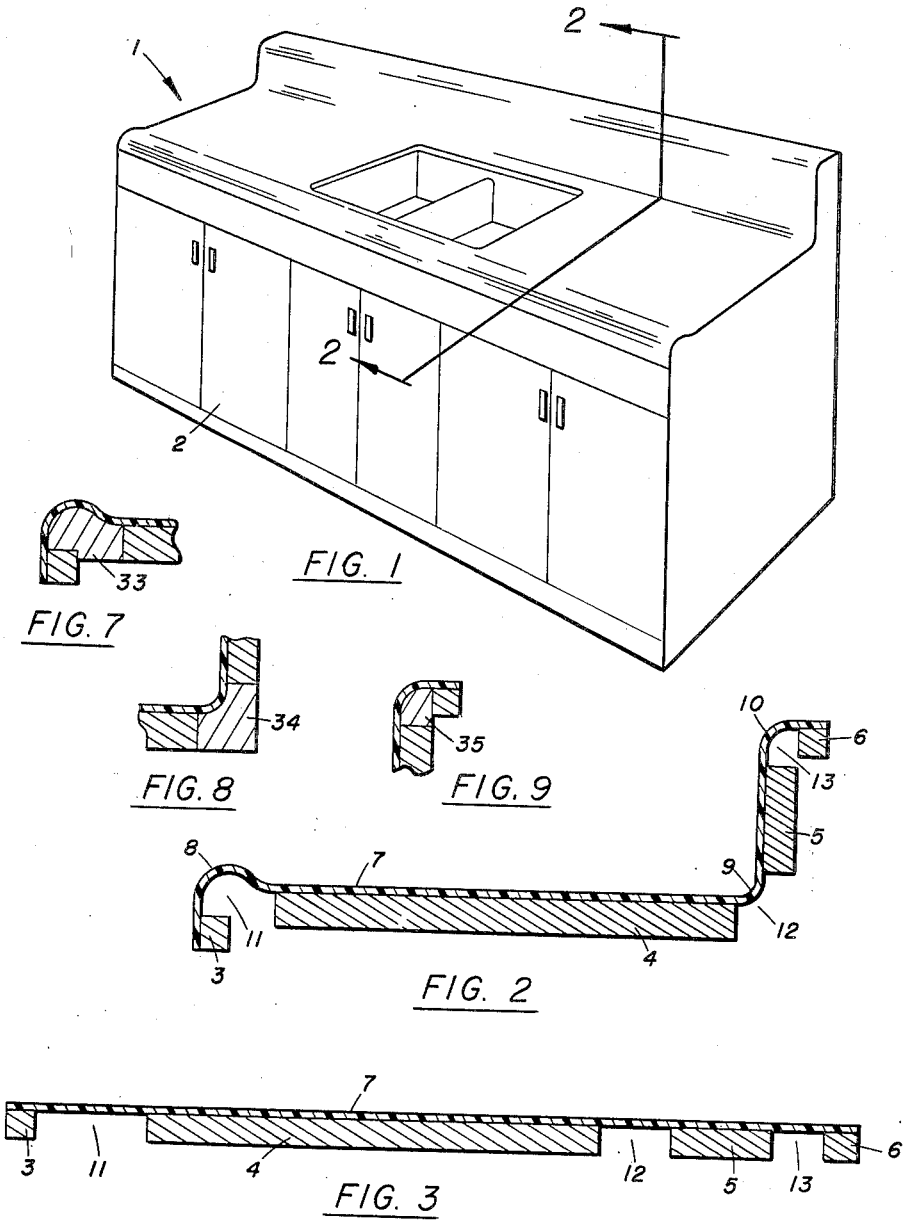
INVENTOR.
WILLIAM I. BEACH
BY
William R. Lane
ATTORNEY

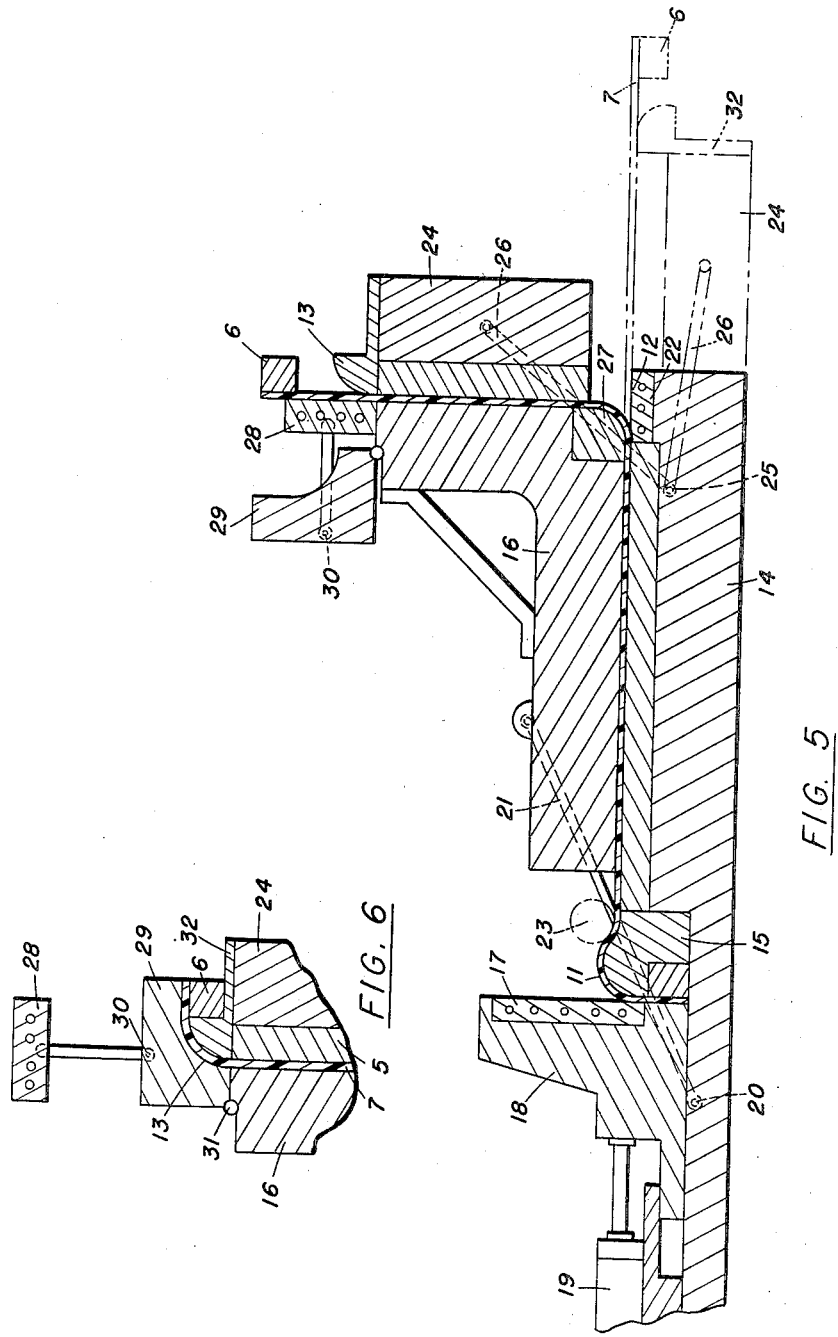

Patented Aug. 11, 1953

2,648,370

UNITED STATES PATENT OFFICE 2,648,370

METHOD AND APPARATUS FOR PROGRESSIVE FORMING OF C-STAGE PLASTIC MATERIAL

William I. Beach, Los Angeles, Calif., assignor to North American Aviation, Inc.

Application March 18, 1950, Serial No. 150,528

5 Claims. (Cl. 154—1)

This invention relates to improvements in method and forming means for utilizing the invention disclosed and claimed in Patent No. 2,433,643 and pending patent application Serial No. 62,074, filed November 26, 1948, in the name of William I. Beach, for Postforming Process and Article now abandoned but continued in patent application Serial No. 300,320, filed July 22, 1952, in the name of William I. Beach, for Postforming Process and Article. This invention provides a process and mechanism for controlling the postforming of thermosetting C-stage plastic material to which are attached spaced backup strips.

More particularly the invention enables the progressive forming of successive sections of the unsupported plastic surface sheet lying between the backup strips.

Prior to this invention there have been certain industrial applications of sheets of laminated thermosetting C-stage plastic material as surface sheeting for dinette tops, table tops, counter tops, bars, wainscot, partitions, paneling, and trim. For this purpose, industrial and decorative grades of laminated plastic sheets are attached to rigid backing plates of plywood or other types of light inexpensive bulk material which generally are of the order of twelve times the thickness of the plastic overlay sheeting. The composite panel resulting therefrom is cut or sectioned into separate members of suitable size and shape which are then fabricated in angularly disposed relation to each other. For example, conventional work or service tops of the type used for sinks, drainboards, counters, and the like, are all more or less fabricated in like construction, usually comprising a horizontal deck, an upright back splash, and banked or raised edge portions. In connection therewith, standard manufacturing procedures employ attachment means for fastening the back splash at a right angle to the deck surface, and provide metal finishing trim at the joints of the back splash and deck, as well as covering for the exposed edges. The resulting product, however, possesses joints and metal trims which tend to accumulate dirt in the joints and underneath the metal trims. In addition, various sealing means are employed to prevent drainage of water around the joints and metal trims which by no means insure the article against ultimate leaking at such joints and metal trim. These objectionable features are now effectively eliminated by the use of this invention.

Accordingly, it is an object of this invention to provide a method and means for forming a contoured top for tables or the like of a single sheet of thermosetting C-stage plastic material.

It is also an object of this invention to provide a method and means for forming from a single sheet of C-stage thermosetting plastic sheet material a top of predetermined contour having a flat work surface, parallel sides, and curved edges.

It is another object of this invention to provide a method and apparatus for processing a flat composite panel comprising, securing a surface sheeting of thermosetting C-stage plastic material to substantially thicker reinforcing or backup strips of different material, and progressively bending and postforming successive portions thereof to conform to a predetermined contour having its elements angularly disposed in spaced relation to each other and continuously interconnected by curved portions of the surface sheeting at the juncture of the displaced elements.

It is yet another object of this invention to provide an apparatus for forming plastic laminated material which has attached on one side thereof backup strips in arranged spacing order so constructed that forming thereabout takes place in the area of the surface sheeting between the spaced backup strips.

Likewise, it is an object of this invention to provide an apparatus comprising suitable heating means, dies, and forming members and elements operative in preselected sequence to produce formed articles, preferably of composite construction, wherein a surface sheet of thermosetting C-stage plastic material is attached to relatively thick backup strips so spaced that progressive forming of the surface sheeting takes place in the area between the backup strips, said backup strips consisting of dissimilar bulk material substantially thicker than the plastic surface sheeting.

Other objects and advantages of this invention will hereinafter appear and, for purposes of illustration but not of limitation, an embodiment of the invention is shown on the accompanying drawings, in which Fig. 1 is a perspective view of a household sink and cabinet installation illustrating a completely formed drainboard top;

Fig. 2 is a sectional view taken on line 2—2 through the sink top shown in Fig. 1;

Fig. 3 is a sectional view of a flat panel, prior to forming into the sink top configuration shown in Fig. 2, comprising a surface sheet of thermosetting C-stage plastic attached to spaced backup strips of reinforcing material;

Fig. 5 is a broken sectional view showing the second step in the forming operation in position required to form the curved nose section, and the third step, in alternate open (in phantom) and closed position to form the coved middle section of the top depicted in Fig. 2;

Fig. 6 is a fragmentary view showing the fourth step in the forming operation with the upper portion of the forming apparatus shown in closed position after forming the rear edge curve of the top shown in Fig. 2; and Figs. 7, 8, and 9, are fragmentary details of the finished construction taken at each curved portion of the fully formed top illustrated in Fig. 1.

Figure 4:
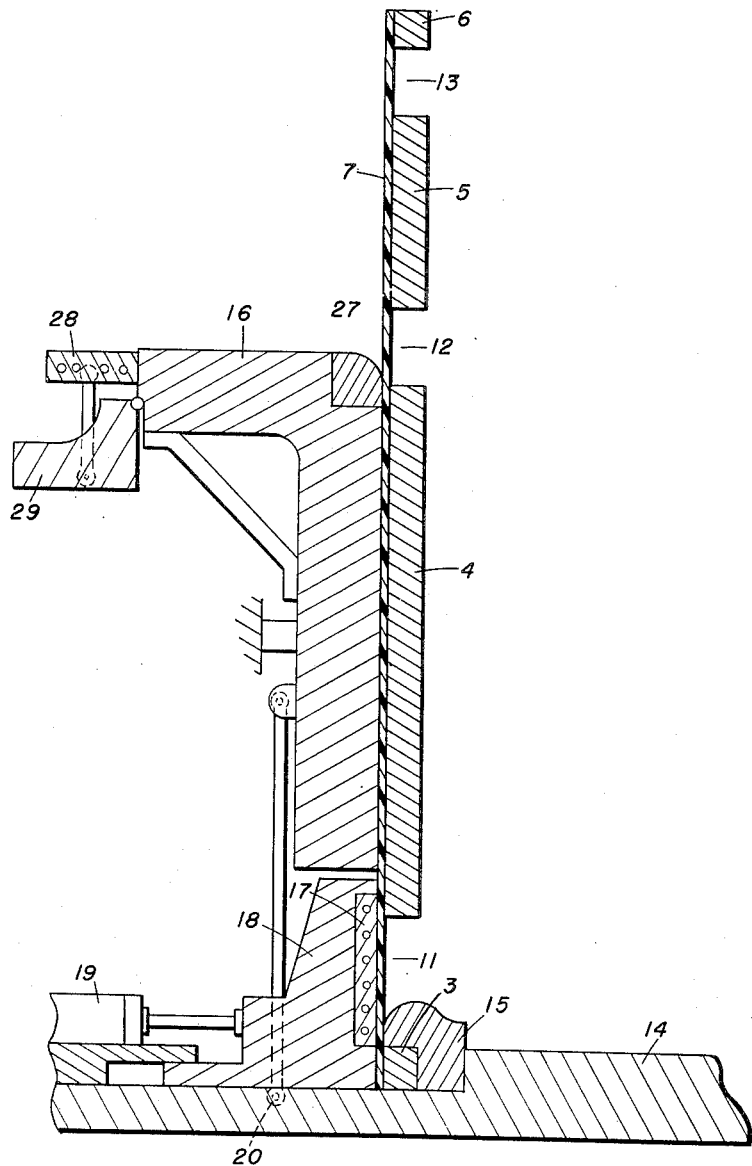
Fig. 4 is a broken sectional view of the forming apparatus in open position showing the first step in the forming operation.

Referring to the drawings, Fig. 1 illustrates a fully formed sink top 1 installed on a kitchen cabinet 2. A sectional view of the top 1 is shown in Fig. 2, comprising spaced backing material 3, 4, 5, and 6, angularly disposed and interconnected by the formed thermosetting C-stage plastic sheeting 7 at the transverse curved nose portion 8, coved back portion 9, and curved top edge portion 10.

The material considered in Fig. 3 is commercially available in flat pieces and may be laminated together between metal plates to provide a uniformly smooth surface. The surface sheeting 7 is of the type comprising laminated material such as, for example, paper, woven fabric, and matted or woven glass fibers impregnated with any suitable thermosetting resin such as phenol, urea, melamine, formaldehyde resins and their derivatives, including the group of unsaturated polyester resins. This material, known in the art as thermosetting C-stage laminated plastic, is fully processed to the C-stage cure with pressure and temperature. The high pressure laminated sheets of C-stage thermosetting plastic are cured normally under pressures of 1000 to 2000 pounds per square inch. The so-called low pressure type of material designated as thermosetting C-stage plastic may be cured at pressures varying between a few pounds to several hundred pounds per square inch. The election of either high pressure or low pressure material for surface sheeting depends largely upon the amount of surface hardness and dimensional stability desired for application thereof. The second part of the laminated structure shown in Fig. 3 is the backing material, which is preferably ¾-inch plywood although other materials of reduced thickness such as Masonite and other related materials may be used in lieu of plywood provided comparable stiffness is obtained.

Referring again to Fig. 3, predetermined widths of the backing material in strips 3, 4, 5, and 6, are attached to the surface sheeting 7, providing unbacked spaces 11, 12, and 13 between adjacent backup strips wherein the cut-out areas have widths proportional to the amount of curvature imposed in the surface sheeting 7 between the spaced backup strips. It has been found that for best results the space between backup strips should be approximately one and one-half times the radius of the curvature formed in the surface sheeting. If desired, the backup material may be laminated in solid plate form directly to the plastic surface sheeting, whereafter the backup material may be routed or sawed by suitable means to remove material in the areas designated as spaces 11, 12, and 13.

Following the preparation of the plastic covered panel shown in Fig. 3, the first step, as shown in Fig. 4, is to place the panel in an upright position on the forming fixture 14, engaging backup strip 3 with the first die element 15 and securing the upright panel to the first forming member 16. The heater element 17, encased in a movable block 18 slidably operated by a pneumatic cylinder 19, is brought into intimate contact with the formable portion of the surface sheeting at space 11. Proceeding to the second step, when said sheeting is sufficiently heated above 250° F., the first forming member 16, pivotally connected to forming fixture 14 at pivot point 20 by connecting link 21, is rotated clockwise to bend the portion of surface sheeting at space 11 about the first die element 15 until forming member 16, as shown in Fig. 5, is horizontally engaged with forming fixture 14, thereby bringing a second formable portion of surface sheeting at space 12 in intimate contact with a second heater element 22 located at the right end of fixture 14. To insure that the surface sheeting at space 11 conforms intimately with the reverse curvature of die element 15, an auxiliary forming member 23, shown in phantom, may be utilized to provide contact pressure.

In the third step, when the formable portion of surface sheeting at space 12 in contact with heater element 22 is sufficiently heated to a temperature above 250° F., the second movable member 24, pivotal about point 25 by connecting link 26, is rotated upward, bending the formable portion of the surface sheeting at space 12 about second die element 27, and subsequently bringing another formable portion of the surface sheeting at space 13 in intimate contact with a third heater element 28.

In the fourth step, when the formable portion of surface sheeting at space 13 in contact with third heater element 28 is sufficiently heated to above 250° F., the heater element 28, pivotal about the third forming element 29 at hinge point 30 is swung clear of the heated material, Fig. 6, and the third forming element 29, rotatable about hinge point 31, is rotated clockwise to engage a portion of the surface sheeting at space 13 to form same around the third die element 32.

In the fifth step, the material formed in forming fixture 14 is permitted to remain in a restraining position for a time sufficient to permit the heated portions thereof to cool substantially below 150° F., whereupon the first forming member 16 is rotated counter-clockwise into open position, and die elements 15 and 32 are slidably removed endwise to permit the fully formed top to be removed from the forming fixture.

If desired, the next step could be to insert in the curved spaces 11, 12, and 13, form-fitting retaining blocks 33, 34, and 35, as shown in Figs. 7, 8, and 9, which, when sufficiently attached to the adjacent backup strips, will suffice to reinforce the shape of the article after forming of the surface sheeting has been accomplished.

In connection with the performance of this invention, it is to be understood that the material concerned therewith comprises large pieces, frequently 8 to 10 feet long by 3 to 4 feet wide. In view of their weight and size, such panels are extremely difficult to handle by conventional manufacturing processes. Further, when such panels are prepared for top construction, grooves or spaces are provided in the backup material for the purpose of exposing the underneath side of the surface sheeting for postforming in accordance with the process described and claimed in Patent No. 2,433,643. However, since the surface sheeting is preferably a thermosetting C-stage laminated material, the residual amount of plasticity of the resin available for postforming is critically responsive to time and temperature. In fact, when such material is heated sufficiently above 250° F. it must be postformed immediately thereafter, and restrained while in the formed condition until the material temperature substantially subsides. Furthermore, experience shows that the surface sheeting, being very thin and somewhat brittle as compared to the heavier backing materials, is especially sensitive to the amount of distortion or bending forces applied at the unsupported section of material between adjacent backup strips. It can be demonstrated that, if this section of the surface sheeting is not properly supported when subjected to forming influences, premature rupture or cracking of this material is likely to take place. By the same reasoning, if a curved section of the surface sheet, after forming has taken place, is also not properly supported while other sections of the surface are being progressively moved into position for localized heating and forming, the unsupported section will likewise crack due to the excess strains placed thereon through the movement of the panel as a whole. In addition, the surface sheeting must at all times be shielded from over-exposure to heat since repeated heating of the entire surface will ultimately create an embrittled condition, as well as result in a loss of color and other deleterious effects. It follows, therefore, that it is important to maintain the material to be formed in fixed spaced relationship with elements of a forming fixture having operative thereon heater means, forming dies, and movable forming members functionally coordinated to heat and form at one time only that portion of the surface sheeting lying between spaced backup strips, removing said material immediately from the influences of heat, forming the same about an adjacent die, holding said material in fixed curvature and, while other sections of the panel are being progressively arranged in angular displacement with respect to said fixed curvature, to bring the next succeeding section in contact with heating element and forming member in predetermined sequence. Therefore, in view of the foregoing, the present invention takes into account the limitations and operational hazards to provide a method and means for obtaining fully formed articles as described.

Although the invention has been described and illustrated in detail, it is to be clearly understood that the same is by way of illustration and example only and is not to be taken by way of limitation, the spirit and scope of this invention being limited only by the terms of the appended claims.

I claim:

1. The method of producing a reinforced postformed article having a plurality of bends comprising the steps of attaching rigid backup material to a substantially flat sheet of C-stage thermosetting material so as to provide a plurality of backup strips having spaces therebetween at the portions where said thermosetting material is to be bent; placing the thereby assembled sheet in a forming fixture; fixing one end of said assembled sheet in said fixture; subjecting said assembled sheet to a bending operation, said operation comprising disposing a heater on said fixture in the proximity of a portion of the thermosetting material to be bent, locating on said fixture a die having a contour corresponding to a bend to be produced, subjecting the material to be bent to heat from the heater for a sufficient period of time to heat throughout to a temperature above 250° F. and less than about 350° F., moving unfixed portions of said material about said die to produce a desired bend, and holding the material in engagement with said die until cool; and successively repeating said bending operation on other portions of said assembled sheet until said postformed article is completed.

2. A method of postforming the portions of C-stage thermosetting material located between spaced backup strips comprising; placing the material in a forming fixture having heater and die means located in proximity to each portion of unbacked material when such portion is positioned for postforming; fixing one end of the material in said fixture; subjecting the unbacked portion nearest said fixed end to heat for a sufficient period of time to heat it throughout to a temperature above 250° F. and below about 350° F., then moving the unfixed end about said die to conform the unbacked material to said die and holding the material against the die until cool; and thereafter successively so heating and conforming to an adjacent die successive portions of unbacked material.

3. A device for successively bending unreinforced portions of a substantially flat sheet of postformable material provided with reinforcing strips attached thereto to define unreinforced bendable portions, said device comprising a fixture for receiving and holding a reinforced portion of said sheet whereby other portions of said sheet are unconstrained; and a plurality of bending units corresponding in number to the unreinforced portions of said sheet associated with said fixture, each of said units comprising a heater, a die, and a forming member pivotal relative to said fixture, at least one of said forming members being pivotally connected to said fixture, the first of said units being disposed relative to said fixture whereby when said flat sheet is initially received by said fixture the first die is adjacent the first of said unreinforced portions, the first heater is in heat transfer relationship with said unreinforced portion whereby said portion is heatable to a temperature above 250° F. and below about 350° F., and said first forming member is adapted to engage unconstrained portions of said sheet remote from the portion held by said fixture for pivoting said unconstrained portions about said first die, thereby bending said first unreinforced portion about said first die and holding said sheet in such position, the remaining units being disposed whereby they are individually and successively brought into similar association with successive portions of said sheet upon completion of the first and successive bending operations as a result of such bending by preceding units for each performing a similar bending operation on an unreinforced portion of said sheet.

4. A device for forming an object having a plurality of bent portions from a substantially flat sheet of postformable material which has strips of rigid reinforcing material attached thereto so as to define unreinforced portions where a bend is to be made, said device comprising a fixture adapted to receive and hold a reinforced portion of said sheet; a heater associated with said fixture in heat transfer relationship with an unreinforced portion of said sheet when said sheet is so received in said fixture, and adapted to heat said unreinforced portion to a postformable temperature; a die on said fixture adjacent said unreinforced portion when said sheet is so received; a forming member connected to said fixture and movable relative thereto, said forming member being adapted to engage portions of said sheet remote from the portion thereof held by said fixture, to bend said unreinforced portion about said die and hold said sheet in such bent position; a second die and a second heater associated with said fixture remote from said first mentioned die and heater, said second die and heater being disposed whereby said second heater is brought into heat transfer relationship with a second unreinforced portion of said sheet and said second die is adjacent said second unreinforced portion following and as a result of said bend by said forming member, whereby said second heater is adapted to heat said second unreinforced portion to a postformable temperature; and a second forming member adapted to engage portions of said sheet remote from said portions thereof held by said fixture and by said first mentioned forming member for bending said second unreinforced portion about said second die and holding said sheet in such position.

5. The method of producing a reinforced postformed article having a plurality of bends comprising the steps of attaching rigid backup material to a substantially flat piece of C-stage thermosetting material so as to provide a plurality of backup strips having spaces therebetween at the portions where said thermosetting material is to be bent; placing the thereby assembled sheet in a forming fixture; fixing one end of said assembled sheet to said fixture; subjecting said assembled sheet to a plurality of bending operations, said operations each comprising disposing on said fixture a die having a desired contour of bend, disposing a heater on said fixture in the proximity of a portion of the thermosetting material to be bent, subjecting the material to be bent to heat from the heater for a sufficient period of time to heat throughout to a temperature above 250° F. and less than about 350° F., engaging unfixed portions of said material by a forming member for thereby moving unfixed portions of said material about said die to produce a bend, and holding the material in engagement with said die until cool; the die provided for at least one of said bending operations being provided with a reverse curvature, and additionally engaging said material by means of a second forming member for urging said material into intimate contact with all portions of said reversely-curved die whereby said material is provided with a reversely-curved nose portion.

WILLIAM I. BEACH.

References Cited in the file of this patent

UNITED STATES PATENTS

| Number | Name | Date |
| --- | --- | --- |
| 1,906,392 | McLeod | May 2, 1933 |
| 1,913,055 | Keller | June 6, 1933 |
| 1,981,494 | Berg | Nov. 20, 1934 |
| 2,026,698 | Nelson | Jan. 7, 1936 |
| 2,189,078 | Michaelis | Feb. 6, 1940 |
| 2,325,528 | McGowan | July 27, 1943 |
| 2,350,915 | Miller | June 6, 1944 |
| 2,433,643 | Beach | Dec. 30, 1947 |
| 2,446,413 | Esbjornson | Aug. 3, 1948 |
| 2,451,794 | Balsam et al. | Oct. 19, 1948 |